(12) United States Patent
Vander Kooi et al.

(10) Patent No.: US 6,834,873 B1
(45) Date of Patent: Dec. 28, 2004

(54) AXLE SUSPENSION SYSTEM

(75) Inventors: David S. Vander Kooi, Sioux Center, IA (US); Craig A. Jungjohan, Orange City, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 156 days.

(21) Appl. No.: 10/082,033

(22) Filed: Feb. 21, 2002

(51) Int. Cl.$^7$ ............................................. B60G 21/055
(52) U.S. Cl. ........................ 280/124.107; 280/124.116
(58) Field of Search ................... 280/124.106, 124.13, 280/124.137, 124.149, 124.152, 124.157, 124.162, 124.166, 124.107, 124.116, 124.128, 124.156

(56) References Cited

U.S. PATENT DOCUMENTS

| | | | |
|---|---|---|---|
| 2,226,047 A | * 12/1940 | Borgward | 180/353 |
| 3,116,071 A | * 12/1963 | Wilfert et al. | 280/124.166 |
| 3,315,981 A | * 4/1967 | Behles | 280/124.107 |
| 3,575,441 A | * 4/1971 | Arning et al. | 280/124.107 |
| 3,653,683 A | * 4/1972 | Hendrickson | 280/124.162 |
| 3,733,087 A | * 5/1973 | Allison | 280/124.146 |
| 4,072,322 A | * 2/1978 | Fuchs et al. | 280/124.107 |
| 4,146,249 A | * 3/1979 | Paul | 280/124.15 |
| 4,458,915 A | * 7/1984 | Emery | 280/5.524 |
| 4,518,171 A | 5/1985 | Hedenberg | |
| 4,759,567 A | * 7/1988 | Allen | 280/124.162 |
| 4,792,148 A | 12/1988 | Hintz | |
| 4,802,690 A | * 2/1989 | Raidel | 280/124.157 |
| 4,900,057 A | 2/1990 | Raidel | |
| 5,018,756 A | 5/1991 | Mitchell | |
| RE33,630 E | * 7/1991 | Griffin, Sr. | 280/124.106 |
| 5,083,812 A | 1/1992 | Wallace et al. | |
| 5,251,926 A | * 10/1993 | Aulerich et al. | 280/124.152 |
| 5,368,326 A | * 11/1994 | Turck et al. | 280/124.102 |
| 5,403,031 A | 4/1995 | Gottschalk et al. | |
| 5,505,482 A | 4/1996 | VanDenberg | |
| 5,509,684 A | * 4/1996 | Yarrow et al. | 280/124.17 |
| 5,678,845 A | 10/1997 | Stuart | |
| 5,785,345 A | * 7/1998 | Barlas et al. | 280/124.165 |
| 5,820,156 A | 10/1998 | VanDenberg | |
| 5,882,031 A | 3/1999 | VanDenberg | |
| 5,924,712 A | * 7/1999 | Pierce | 280/124.13 |
| 5,944,339 A | 8/1999 | McKenzie et al. | |
| 6,328,322 B1 | * 12/2001 | Pierce | 280/124.131 |
| 2002/0180173 A1 | * 12/2002 | Daily et al. | 280/124.166 |

OTHER PUBLICATIONS

Tuthill Transport Technologies advertisement for Model 345P Super Duty Air Suspension (undated).
Ridewell Suspensions advertisement for Model RAD–227WB suspension (2001).

* cited by examiner

*Primary Examiner*—Paul N. Dickson
*Assistant Examiner*—Laura B. Rosenberg
(74) *Attorney, Agent, or Firm*—Thomte, Mazour & Niebergall; Dennis L. Thomte

(57) ABSTRACT

An axle suspension system for a load-bearing vehicle is described which comprises first and second mounting brackets secured to the longitudinally extending frame members of the vehicle. First and second lower control arms are pivotally secured at their forward ends to the first and second mounting brackets and extend rearwardly therefrom. First and second axle supports are positioned rearwardly of the first and second mounting brackets and have the rearward ends of the first and second lower control rods pivotally secured thereto. An axle and wheel assembly is secured to the first and second axle supports. First and second air springs are operatively secured to the first and second axle supports. A stabilizer bar assembly is provided and combines the functions of a stabilizer bar and upper control arms. The stabilizer bar assembly includes a central base portion which is pivotally secured to the first and second axle supports and which has forwardly extending end portions provided at the opposite ends thereof. The forward ends of the end portions of the stabilizer bar assembly are pivotally connected to the first and second mounting brackets to perform the function of upper control arms. The stabilizer bar assembly combines the function of a stabilizer bar and upper control arms.

2 Claims, 6 Drawing Sheets

AXLE SUSPENSION SYSTEM

BACKGROUND OF THE INVENTION

1. Field of the Invention

This invention relates to an axle suspension system and more particularly to a drive axle suspension system utilizing a parallelogram-type suspension system. More particularly, the axle suspension system of this invention combines the functions of upper control arms and a stabilizer bar.

2. Description of the Related Art

In many conventional rear drive axle suspension systems for trucks, the opposite ends of the rear drive axle are secured to the frame members of the truck by leaf spring suspension systems. Although the leaf spring suspension systems have functioned well for many years, it is sometimes desirable to replace the leaf springs with air spring to enhance the load carrying characteristics of the suspension system.

One prior art axle suspension system is known as a parallelogram-type axle suspension system wherein a pair of upper and lower control arms are provided beneath each of the frame members of the truck with the forward ends of the control arms being pivotally secured to mounting brackets and with the rearward ends of the control arms being secured to axle supports. Although the parallelogram-type axle suspension systems have met with considerable success, a separate sway bar or stabilizer bar is sometimes required to control roll or sway movements. The need for a separate stabilizer bar involves additional mounting problems and expense.

SUMMARY OF THE INVENTION

In the instant invention, a conventional leaf spring suspension system is replaced with an air spring suspension system. First, the leaf springs are removed from the first and second frame members of the truck and are removed from the axle. First and second mounting brackets are secured to the first and second frame members and extend downwardly therefrom. First and second lower control arms are pivotally secured at their forward ends to the first and second mounting brackets, respectively, and extend rearwardly therefrom. The first and second lower control arms are pivotally secured at their rearward ends to first and second axle supports, respectively. The first and second axle supports support the axle and wheel assembly thereon in a conventional manner. A stabilizer bar assembly is provided including an elongated, generally transversely extending base portion having first and second generally forwardly extending end portions at the opposite ends thereof. The base portion of the stabilizer bar assembly is pivotally secured to each of the first and second axle supports. The forward ends of the first and second generally forwardly extending end portions of the stabilizer bar assembly are pivotally secured to the first and second mounting brackets above the lower control arms. The stabilizer bar assembly combines the functions of upper control arms and a stabilizer or sway bar. It should be noted that the stabilizer bar assembly could combine the functions of the lower control arms with independent upper control arms.

It is therefore a principal object of the invention to provide an improved axle suspension system.

Still another object of the invention is to provide an axle suspension system of the parallelogram-type wherein the functions of either the upper or lower control arms and a stabilizer bar are combined into one.

These and other objects will be apparent to those skilled in the art.

DESCRIPTION OF THE PREFERRED EMBODIMENT

Figure 5:
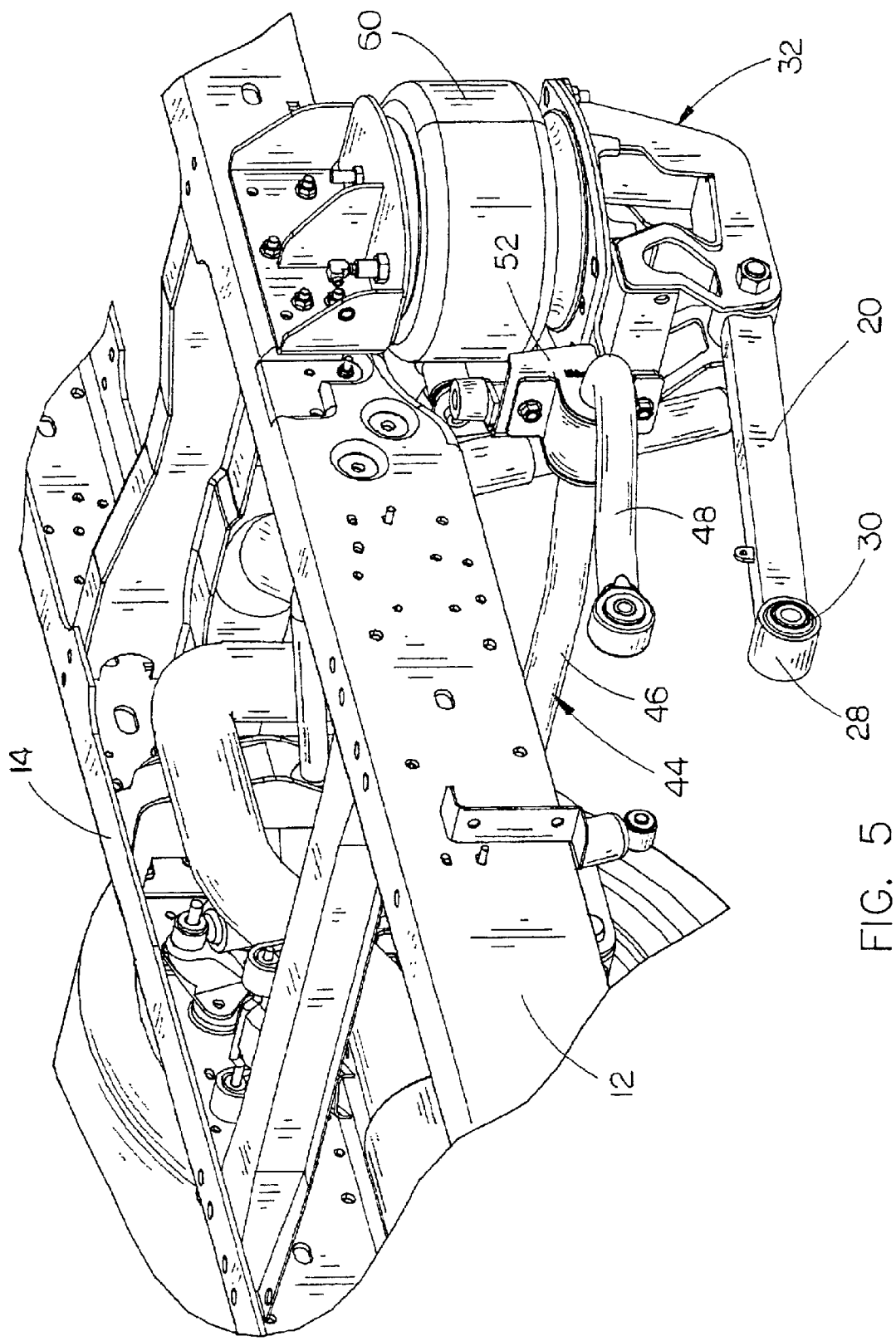
FIG. 5 is a partial front perspective view illustrating the axle suspension system of this invention.
Figure 6:
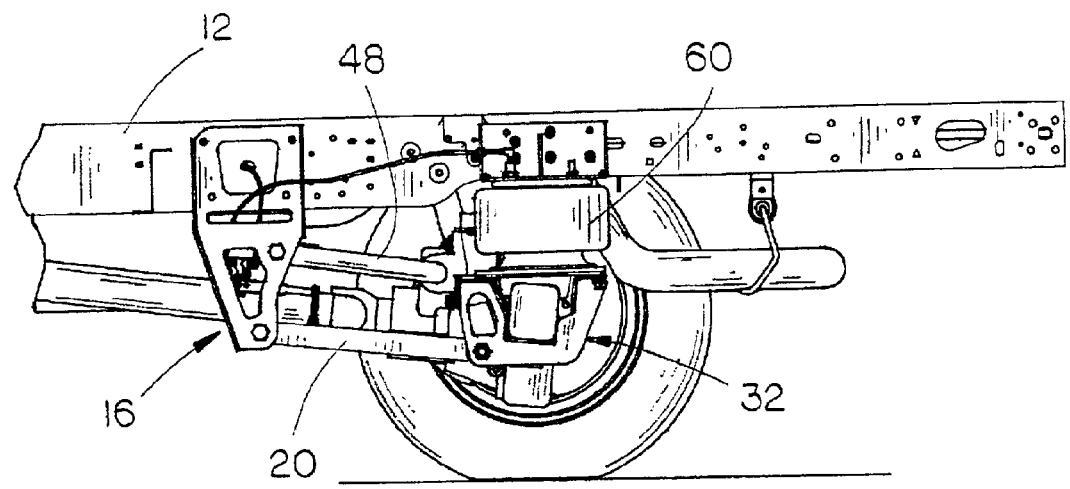
FIG. 6 is a partial side view of the invention.
Figure 7:
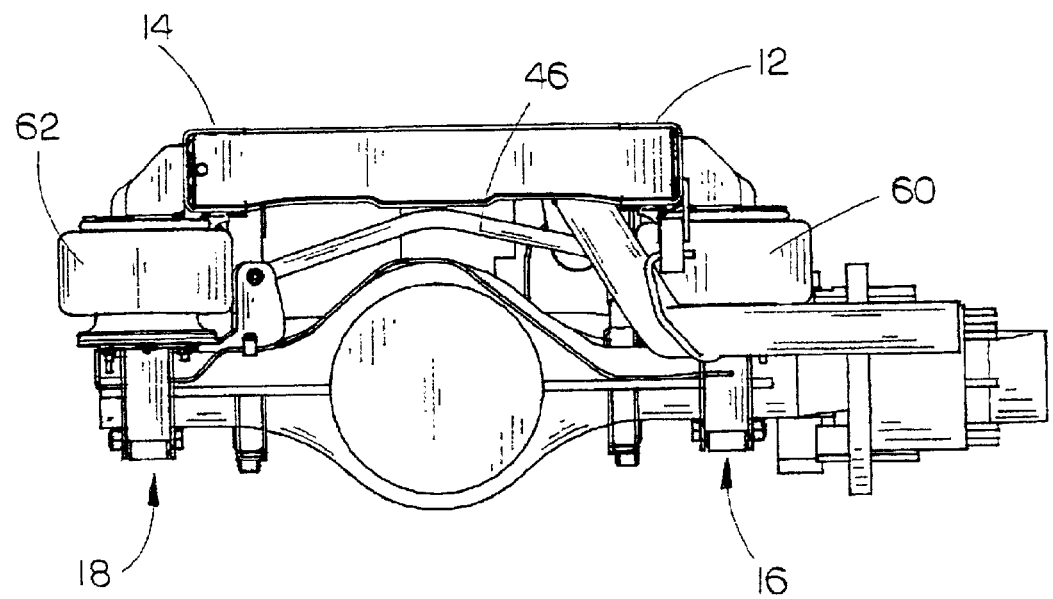
FIG. 7 is a partial rear view of the invention.

The axle suspension system of this invention is referred to generally by the reference numeral 10 and is ideally suited for use on a truck having longitudinally extending frame members 12 and 14. Suspension system 10 includes mounting bracket assemblies 16 and 18 which are secured to the frame members 12 and 14, respectively, by bolts, welding, etc. Lower control arms 20 and 22 are pivotally connected at their forward ends to the lower ends of the mounting bracket assemblies 16 and 18, respectively, by bolts 24 and 26, respectively. Preferably, the forward ends of each of the lower control arms 20 and 22 are provided with sleeves 28 having bushings 30 therein (FIG. 5).

The rearward ends of lower control arms 20 and 22 are pivotally connected to axle supports 32 and 34 by bolts 36 and 38, respectively. It is also preferred that the rearward ends of the control arms 20 and 22 have sleeves 40 and 42 mounted thereon, respectively, which have bushings provided therein. The axle supports 32 and 34 are adapted to have the axle of the axle suspension system mounted thereon in conventional fashion.

The numeral 44 refers to a stabilizer bar assembly which performs the functions of a stabilizer bar and upper control arms for the suspension system as will now be described. Stabilizer bar assembly 44 includes a generally transversely extending base portion 46 having generally forwardly extending end portions 48 and 50. The outer ends of base portion 46 extend outwardly and rearwardly and thence outwardly through pivot mounts 52 and 54, respectively, which are secured to the axle supports 32 and 34 for movement therewith. Preferably, the pivot mounts 52 and 54 include resilient bushings therein.

Figure 3:
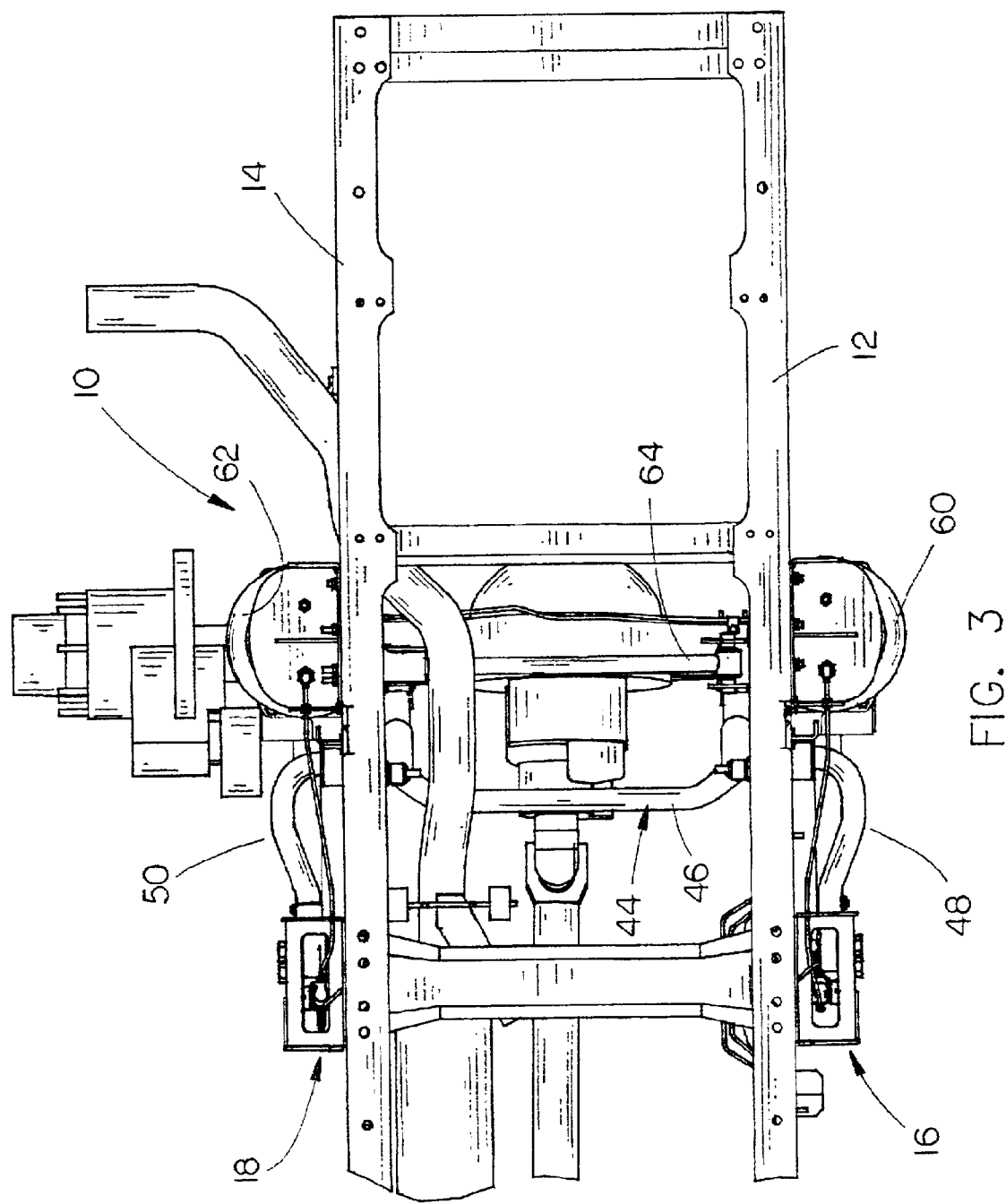
FIG. 3 is a top view of the axle suspension system of this invention mounted on a truck frame.
Figure 4:
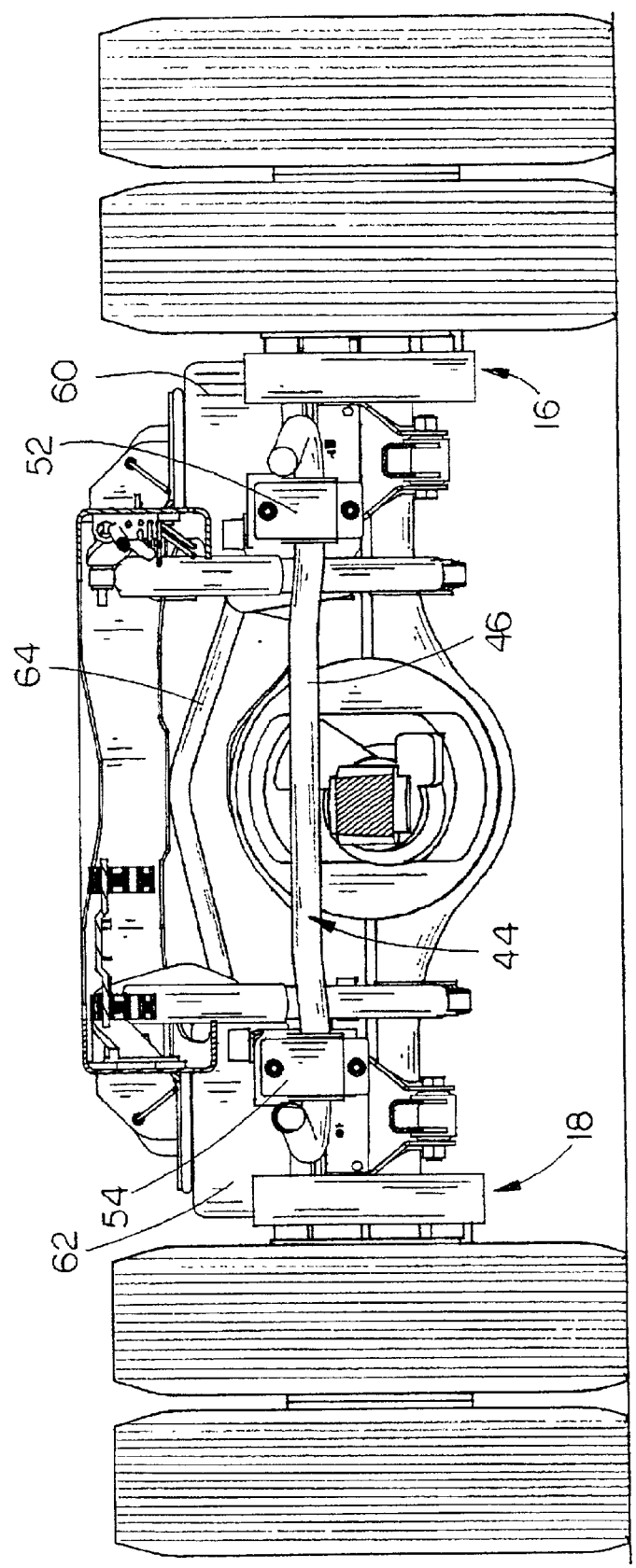
FIG. 4 is a front view illustrating the axle suspension system of this invention mounted on a truck.

As seen in FIG. 3, the forwardly extending end portions 48 and 50 of stabilizer bar assembly 44 extend outwardly and inwardly, thence forwardly, thence inwardly and forwardly, and thence forwardly for clearance around objects. The precise configuration of the stabilizer bar assembly 44 will be dependent upon the particular truck involved. The forward ends of forwardly extending end portions 48 and 50 are pivotally secured to the mounting brackets 16 and 18 by means of bolts 56 and 58, respectively. The forward ends of the forwardly extending end portions 48 and 50 are preferably provided with sleeves and bushings to facilitate the pivotal connection to the mounting brackets 16 and 18, respectively.

Figure 1:
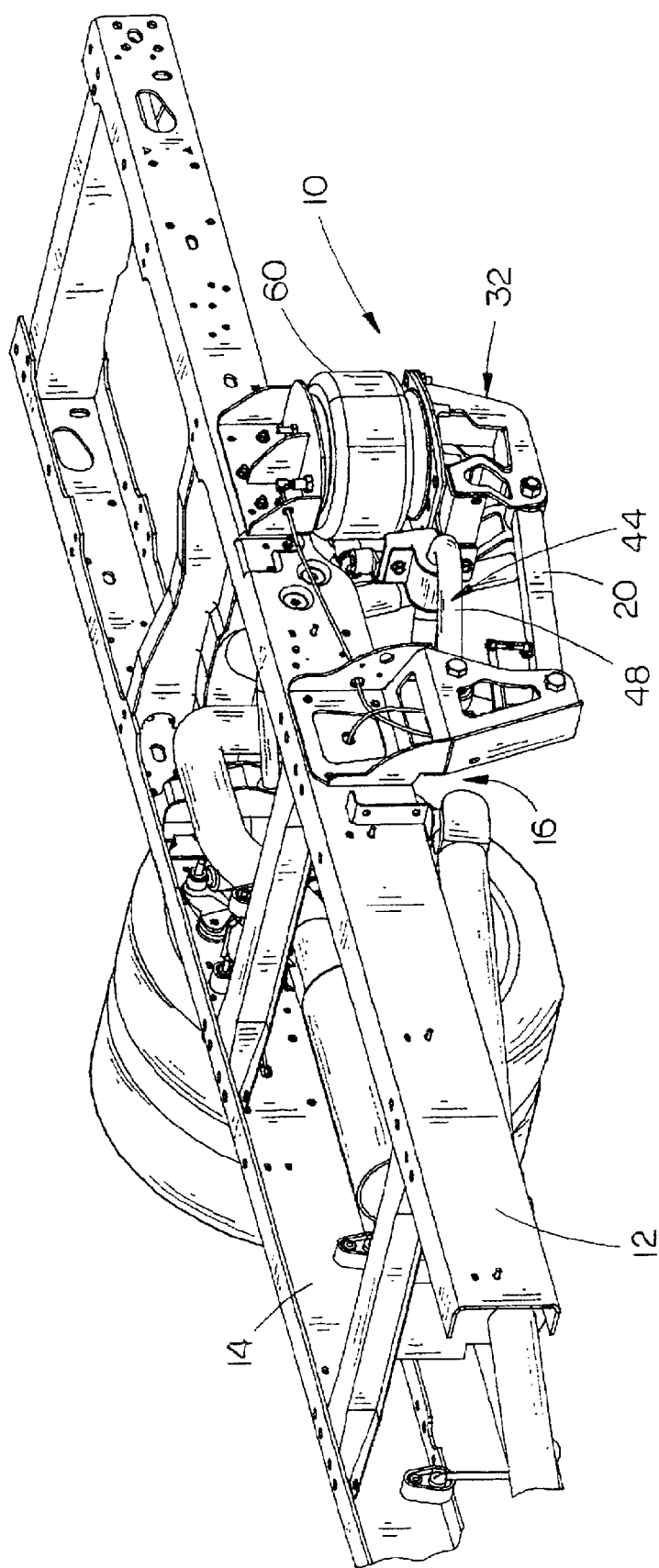
FIG. 1 is a partial front perspective view of the axle suspension system of this invention mounted on the frame members of a truck with portions thereof removed to more fully illustrate the invention.
Figure 2:
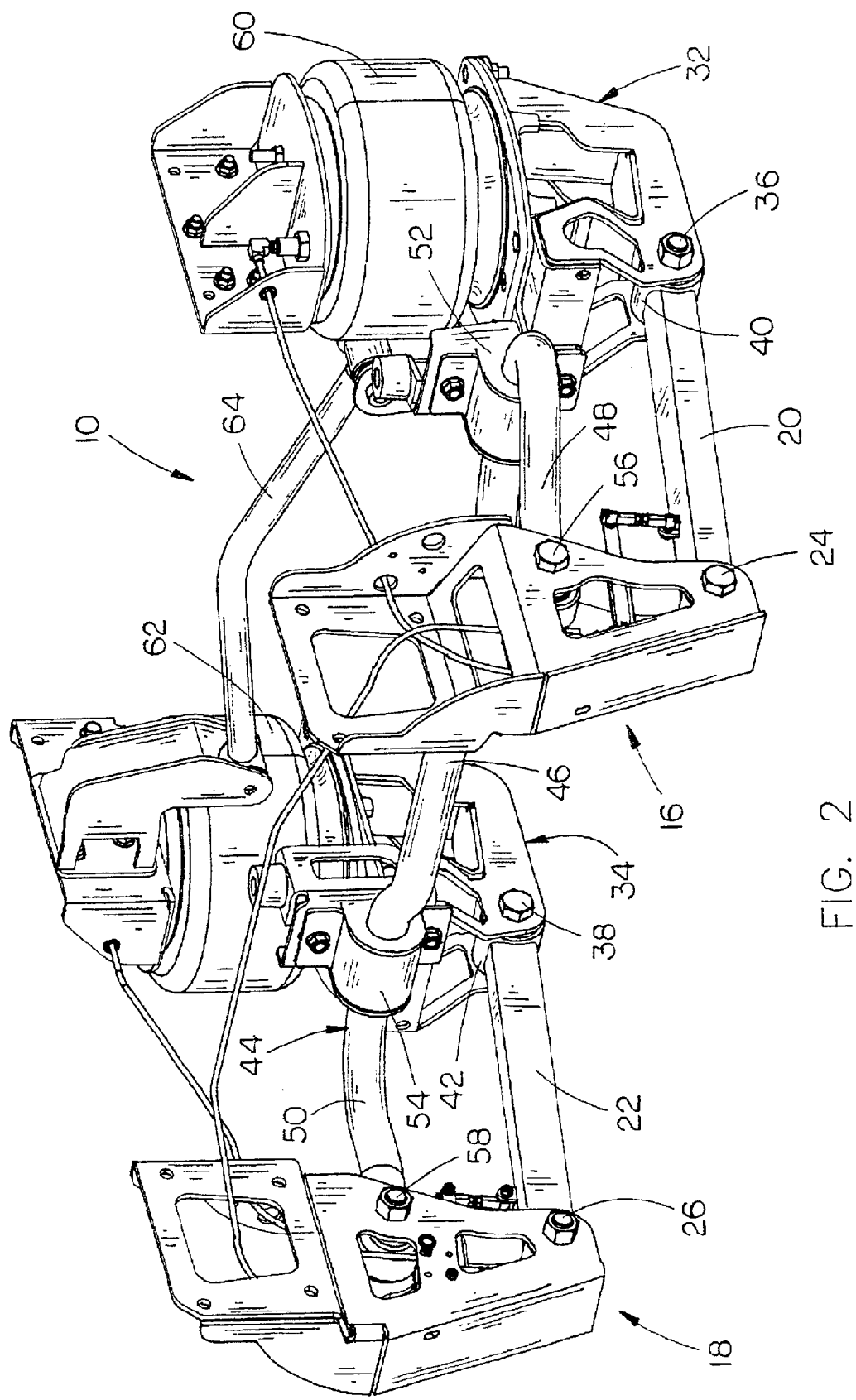
FIG. 2 is a front perspective view of the axle suspension system of this invention.

The numerals 60 and 62 refer to conventional air springs or the like which are positioned on the upper ends of the axle supports 32 and 34, as seen in FIG. 2, and which have their upper ends bolted or otherwise secured to frame members 12 and 14, respectively. FIG. 2 also illustrates an additional lateral control bar 64 which extends between the air spring mounting brackets to control relative side to side movement between axle and chassis.

When installed, the air springs are used to carry the vehicle load instead of conventional leaf springs. The lower control arms 20 and 22 and the end portions 48 and 50 provide the parallelogram-type mounting for the suspension system. It can be seen that the functions of a stabilizer rod and upper control arms have been combined into a single structure, that is, stabilizer bar assembly 44. The end portions 48 and 50 of stabilizer bar assembly 44 function as the upper control arms in the parallelogram-type suspension system. The stabilizer bar assembly provides the necessary stability or anti-sway or anti-roll characteristics of the invention.

Although the embodiment illustrated and described combines the functions of the upper control arms and a sway bar, the system could combine the functions of the lower control arms and a sway bar with independent upper control arms.

Thus it can be seen that the invention accomplishes at least all of its stated objectives by providing a stabilizer bar assembly which combines the functions of a stabilizer bar and upper control arms.

We claim:

1. An axle suspension system for a load-bearing vehicle including first and second longitudinally extending frame members having rearward and forward ends, comprising:

first and second mounting brackets secured to said first and second frame members, respectively;

a first lower control arm, having forward and rearward ends, pivotally secured at its said forward end to said first mounting bracket and extending rearwardly therefrom;

a second lower control arm, having forward and rearward ends, pivotally secured at its said forward end to said second mounting bracket and extending rearwardly therefrom;

first and second axle supports positioned rearwardly of said first and second mounting brackets, respectively;

said rearward end of said first lower control rod being pivotally secured to said first axle support;

said rearward end of said second lower control rod being pivotally secured to said second axle support;

an axle and wheel assembly operatively secured to said first and second axle supports;

first and second air springs operatively secured to said axle and wheel assembly;

and a stabilizer bar assembly including an elongated, generally transversely extending base portion having first and second generally forwardly extending end portions at the opposite ends thereof;

said end portions having forward ends;

said first and second forwardly extending end portions of said stabilizer bar assembly being pivotally connected at their said forward ends to said first and second mounting brackets, respectively, above said first and second lower control rods, respectively;

said base portion of said stabilizer bar assembly being pivotally connected to said first and second axle supports above said first and second lower control rods;

said first generally forwardly extending end portion of said stabilizer bar assembly extending outwardly from said first axle support, thence forwardly, thence inwardly and forwardly, and thence forwardly towards said first mounting bracket and wherein said second generally forwardly extending end portion of said stabilizer bar assembly extends outwardly from said second axle support, thence forwardly, thence inwardly and forwardly, and thence forwardly towards said second mounting bracket;

said base portion of said stabilizer bar assembly extending inwardly and forwardly from its pivotal connection with said first axle support, thence inwardly, thence outwardly and rearwardly to its pivotal connection with said second axle support.

2. An axle suspension system for a load-bearing vehicle including first and second longitudinally extending frame members having rearward and forward ends, comprising:

first and second mounting brackets secured to said first and second frame members, respectively;

a first lower control arm, having forward and rearward ends, pivotally secured at its said forward end to said first mounting bracket and extending rearwardly therefrom;

a second lower control arm, having forward and rearward ends, pivotally secured at its said forward end to said second mounting bracket and extending rearwardly therefrom;

first and second axle supports positioned rearwardly of said first and second mounting brackets, respectively;

said rearward end of said first lower control rod being pivotally secured to said first axle support;

said rearward end of said second lower control rod being pivotally secured to said second axle support;

an axle and wheel assembly operatively secured to said first and second axle supports;

first and second air springs operatively secured to said axle and wheel assembly;

and a stabilizer bar assembly including an elongated, generally transversely extending base portion having first and second generally forwardly extending end portions at the opposite ends thereof;

said end portions having forward ends;

said first and second forwardly extending end portions of said stabilizer bar assembly being pivotally connected at their said forward ends to said first and second mounting brackets, respectively, above said first and second lower control rods, respectively;

said base portion of said stabilizer bar assembly being pivotally connected to said first and second axle supports above said first and second lower control rods;

said base portion of said stabilizer bar assembly extending inwardly and forwardly from its pivotal connection with said first axle support, thence inwardly, thence outwardly and rearwardly to its pivotal connection with said second axle support.

* * * * *